(12) United States Patent
Hoogland (10) Patent No.: US 11,940,157 B2
(45) Date of Patent: Mar. 26, 2024

(54) WATER DRIP COLLECTOR FOR STEAM GENERATION

(71) Applicant: Koninklijke Fabriek Inventum B.V., Nieuwegein (NL)

(72) Inventor: Frank Hoogland, Leusden (NL)

(73) Assignee: Koninklijke Fabriek Inventum B.V., Nieuwegein (NL)

( * ) Notice: Subject to any disclaimer, the term of this patent is extended or adjusted under 35 U.S.C. 154(b) by 401 days.

(21) Appl. No.: 16/814,272

(22) Filed: Mar. 10, 2020

(65) Prior Publication Data

US 2022/0003426 A1    Jan. 6, 2022

(51) Int. Cl.
*F24C 15/32* (2006.01)
*A47J 27/04* (2006.01)
*B64D 11/04* (2006.01)

(52) U.S. Cl.
CPC ............. *F24C 15/327* (2013.01); *A47J 27/04* (2013.01); *B64D 11/04* (2013.01); *A47J 2027/043* (2013.01)

(58) Field of Classification Search
None
See application file for complete search history.

(56) References Cited

U.S. PATENT DOCUMENTS

| | | | |
|---|---|---|---|
| 4,587,946 A | 5/1986 | Doyoun et al. | |
| 5,530,223 A * | 6/1996 | Culzoni et al. | A21B 3/04 219/401 |
| 5,680,810 A | 10/1997 | Sham | |
| 6,602,530 B1 | 8/2003 | Weber et al. | |
| 6,987,246 B2 * | 1/2006 | Hansen et al. | A21B 1/24 219/401 |
| 8,354,620 B2 | 1/2013 | Frock et al. | |
| 8,857,324 B2 | 10/2014 | Hozumi et al. | |
| 10,451,290 B2 * | 10/2019 | Mayberry | F24C 15/00 |
| 2011/0100477 A1 | 5/2011 | Miller | |
| 2013/0259455 A1 * | 10/2013 | Schootstra et al. | F22B 3/00 392/394 |
| 2016/0061458 A1 * | 3/2016 | van der Linden | F24C 15/32 |

FOREIGN PATENT DOCUMENTS

| | | | |
|---|---|---|---|
| CA | 1199229 A | 1/1986 | |
| CN | 2660348 Y | 12/2004 | |
| EP | 1016832 A2 * | 7/2000 | ............ F24C 15/327 |
| EP | 1669676 A1 * | 6/2006 | ................ F24C 1/00 |
| EP | 2994697 B1 * | 2/2019 | ............... A21B 3/04 |
| KR | 20060006472 A * | 1/2006 | ............ F24C 15/327 |

OTHER PUBLICATIONS

Machine translation of KR 20060006472 A performed on Aug. 29, 2022, Cho et al. (Year: 2006).*
Machine translation of EP 1016832 A2 performed on Nov. 28, 2022, Wuest (Year: 2000).*
Machine translation of EP 2994697 B1 performed on Apr. 19, 2023, Adam et al. (Year: 2019).*
Machine translation of EP 1016832 A2 performed on Apr. 19, 2023, Wuest (Year: 2000).*

* cited by examiner

*Primary Examiner* — Dana Ross
*Assistant Examiner* — Kevin Guanhua Wen
(74) *Attorney, Agent, or Firm* — Suiter Swantz pc llo (57) ABSTRACT

A water injection system injects water drops for conversion into steam into an oven in a more controllable manner than existing systems, and more evenly distributes the steam within the oven. The water drops are isolated in a defined area with a drip plate where scale may accumulate. The drip plate may be easily cleaned of scale or may be easily replaceable.

14 Claims, 8 Drawing Sheets

WATER DRIP COLLECTOR FOR STEAM GENERATION

BACKGROUND

Aircraft ovens often include water injectors to create steam inside the oven. Those water injectors are disposed above an internal fan such that water drops are dispersed by the internal fan to contact nearby heating elements to boil into steam; the steam is then drawn through the fan into the oven interior.

It would be advantageous if there were a water injection system to inject steam into an oven at a singular location, and to manage steam distribution within the oven.

SUMMARY

In one aspect, embodiments of the inventive concepts disclosed herein are directed to a water injection system to inject steam into an oven in a more controllable manner than existing systems, and to more evenly distribute the steam within the oven.

In a further aspect, the water drops are isolated in a defined area with a drip plate where scale may accumulate. The drip plate may be easily cleaned of scale or may be easily replaceable.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a water injection system to inject steam into an oven in a more controllable manner than existing systems, and to more evenly distribute the steam within the oven.

Figure 1:
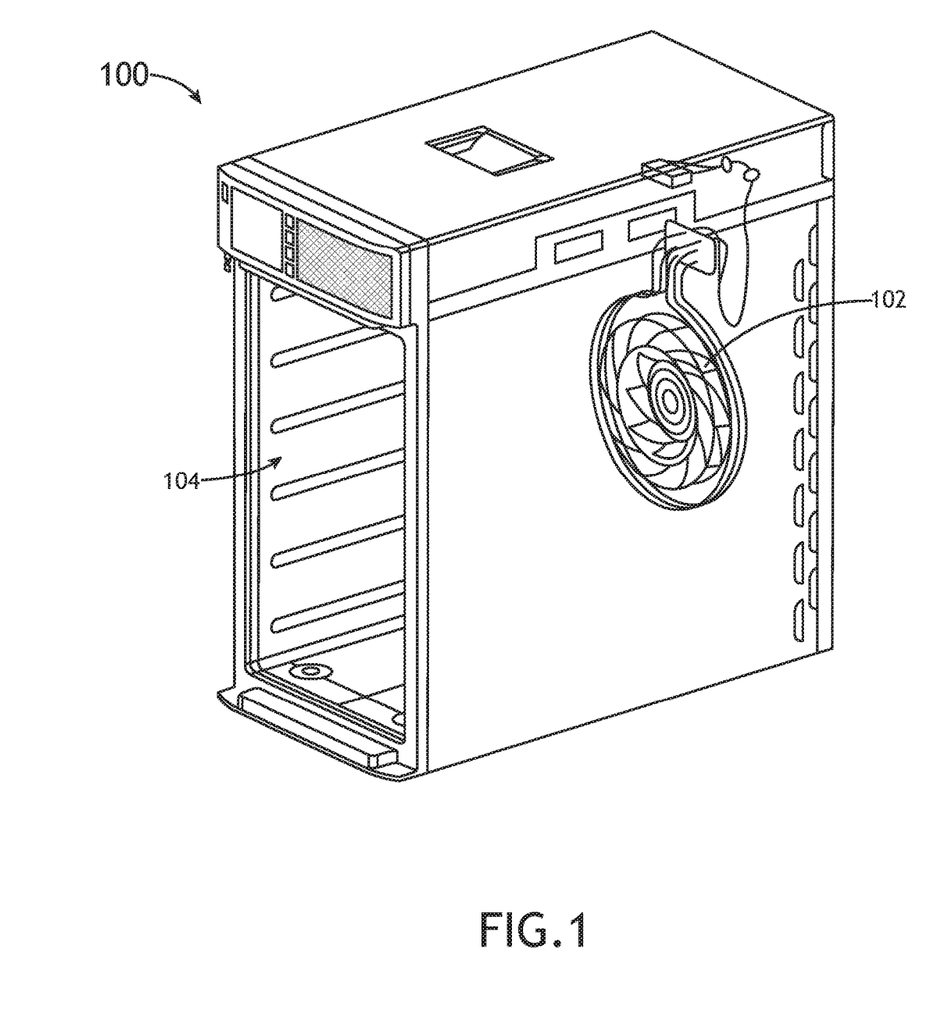
FIG. 1 shows an environmental view of an aircraft galley oven including exemplary embodiment of a water injection system.

Referring to FIG. 1, an environmental view of an aircraft galley oven 100 including exemplary embodiment of a water injection system is shown. The oven 100 includes a fan 102 for moving air through and around a heating coil, and into the oven interior 104. It is often desirable to inject steam into the interior 104.

Figure 2:
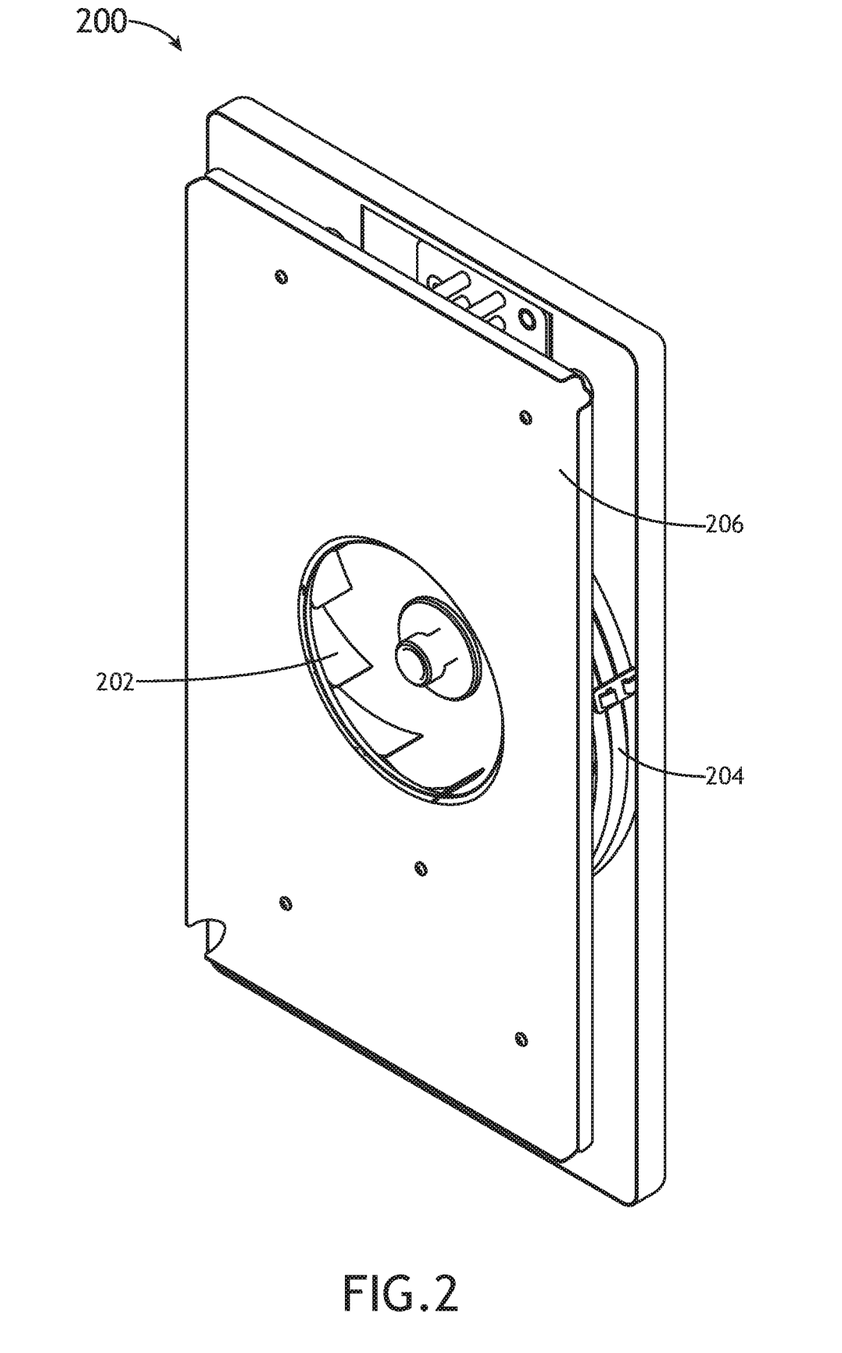
FIG. 2 shows a perspective view of a heating element/fan assembly with a baffle plate.

Referring to FIG. 2, a perspective view of a heating element/fan assembly 200 with a baffle plate 206 is shown. Ovens utilizing embodiments of the present disclosure generally include a heating element/fan assembly 200 having a fan 202 surrounded by a heating element 204. In operation, the fan 202 circulates air from a central opening, through or around the heating element 204, and around the baffle plate 206 to distribute heated air. A water injector (obscured) deposits water onto a drip plate (obscured) to produce steam that is circulated via the airflow produced by the fan 202.

Figure 3:
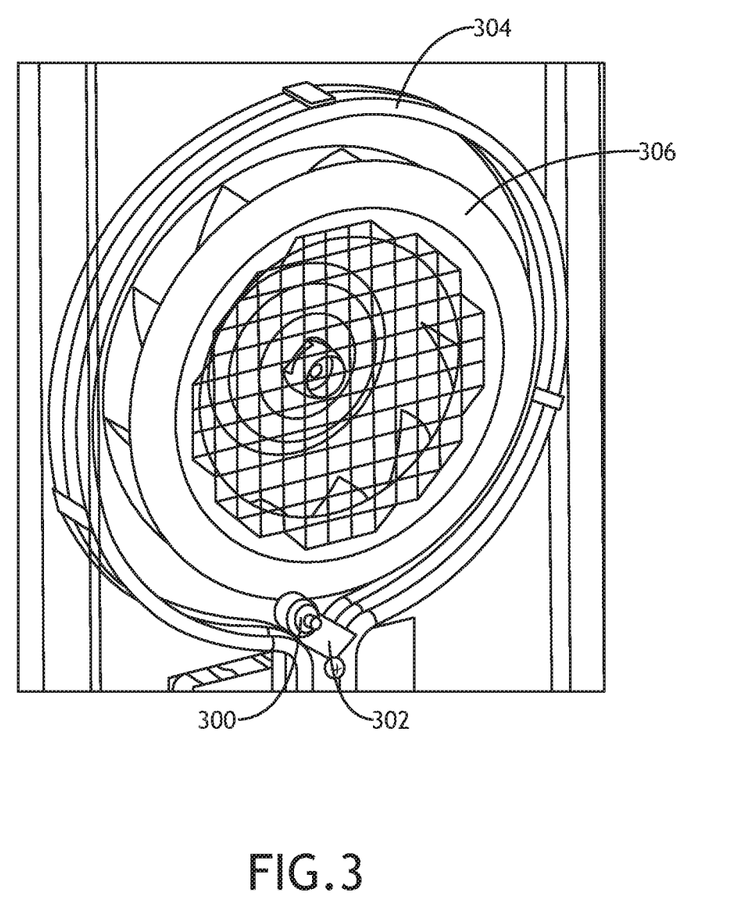
FIG. 3 shows a perspective, environmental view of a water injection system according to an exemplary embodiment.

Referring to FIG. 3, a perspective, environmental view of a water injection system according to an exemplary embodiment is shown. In an aircraft galley oven, a water injector 300 and corresponding drip plate 302 are disposed above a heating element 304 and below a fan 306. In at least one embodiment, the drip plate 302 is disposed proximal to the heating element 304, close enough to allow the drip plate 302 to be heated to at least the boiling point of water by the heating element 304 when in operation. In at least one embodiment, the drip plate 302 is physically in contact with the heating element 304. In at least one embodiment, the drip plate 302 is disposed above the contacts of the heating element 304 such that the heating element 304 contacts are not directly exposed to water and generally less exposed to steam as compared to existing water injection systems.

In operation, the fan 306 draws air in from the interior of the oven through a central opening, and distributes air and steam around the periphery, past the heating element 304, and back into the oven interior.

Figure 4:
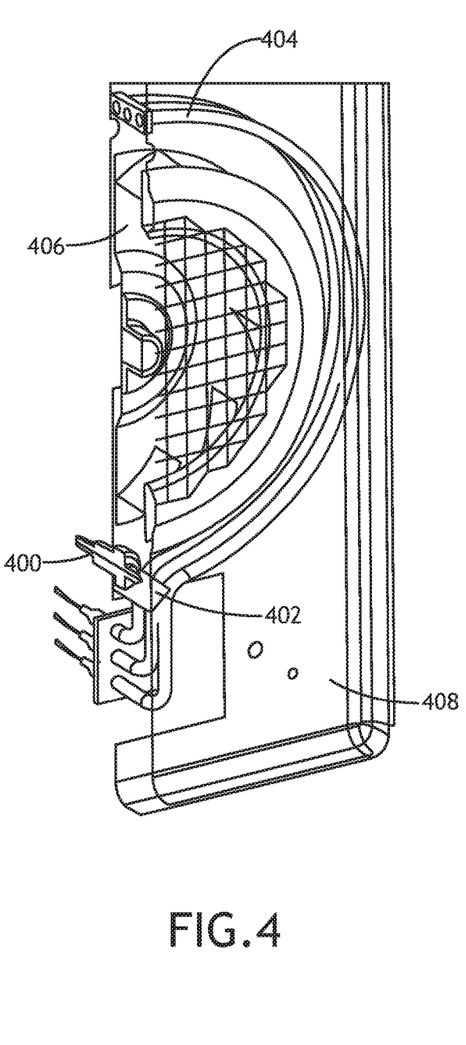
FIG. 4 shows a partial, perspective view of a water injection system according to an exemplary embodiment.

Referring to FIG. 4, a partial, perspective view of a water injection system according to an exemplary embodiment is shown. In an aircraft galley oven, a water injector 400 and corresponding drip plate 402 are disposed between a heating element 404 and a fan 406, proximal to or in contact with the heating element 404, close enough to allow the drip plate 402 to be heated to at least the boiling point of water by the heating element 404 when in operation.

The drip plate 402 may be affixed to an internal surface of a baffle plate 408. The baffle plate 408 generally covers the heating element 404 and controls airflow. In at least one embodiment, the baffle plate 408 includes baffle structures or vanes configured to alter the flow of air and steam within the oven to evenly distribute the steam. Such baffle structures may be configured to distribute steam within the rectangular interior space of the oven. For example, the baffle plate 408 may define a plurality of openings around the edge.

In at least one embodiment, the baffle plate 408 defines a drip plate opening such that the drip plate 402 may be inserted at a defined location, without removing the baffle plate 408. The drip plate 402 may be removable for cleaning or replacement.

Figure 5:
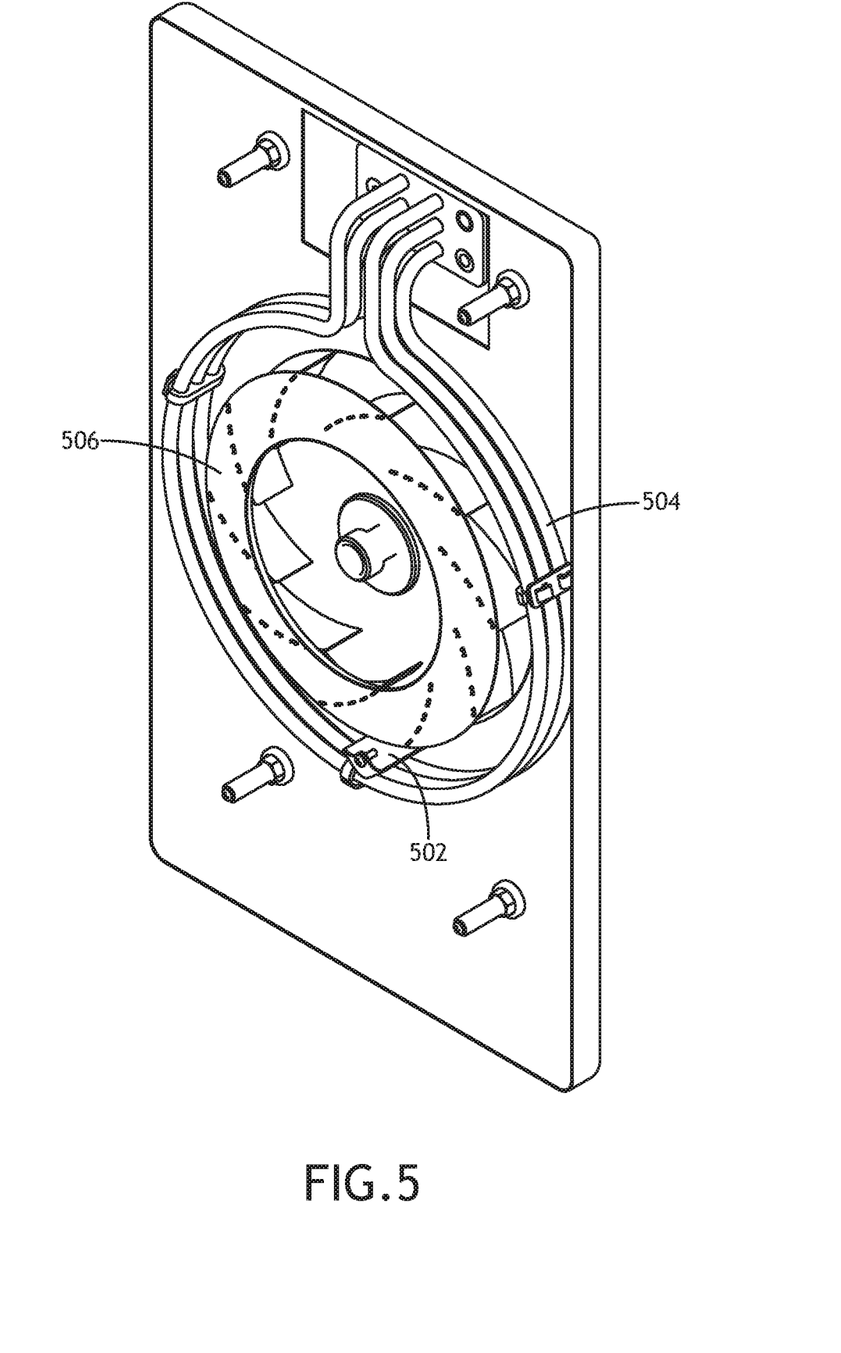
FIG. 5 shows a perspective, environmental view of a water injection system according to an exemplary embodiment.

Referring to FIG. 5, a perspective, environmental view of a water injection system according to an exemplary embodiment is shown. The water injector (obscured) is disposed above a drip plate 502 to deposit water onto the drip plate 502. The drip plate 502 is disposed between a heating element 504 and a fan 506 such that the heating element 504 heats the drip plate 502 sufficiently to create steam. In at least one embodiment, the drip plate 502 is disposed directly below a centerline of the fan 506.

Figure 6:
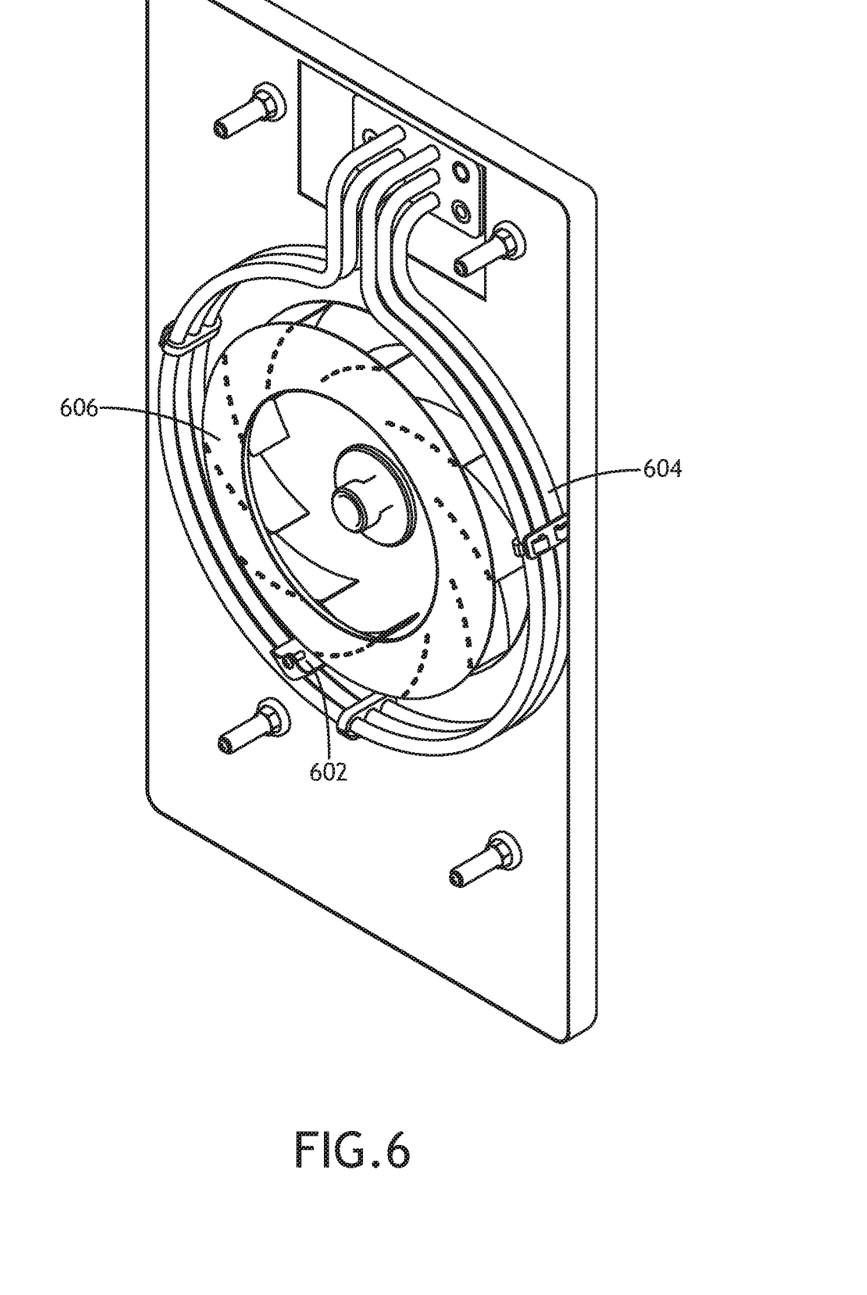
FIG. 6 shows a perspective, environmental view of a water injection system according to an exemplary embodiment.

Referring to FIG. 6, a perspective, environmental view of a water injection system according to an exemplary embodiment is shown. The water injector (obscured) is disposed above a drip plate 602 to deposit water onto the drip plate 602. The drip plate 602 is disposed between a heating element 604 and a fan 606 such that the heating element 604 heats the drip plate 602 sufficiently to create steam. In at least one embodiment, the drip plate 602 is disposed generally below and along the perimeter of the fan 606, some distance from a centerline. The shape and airflow characteristics of the fan 606 defines a location of the drip plate 602 to efficiently distribute steam to the interior of the oven, along with a corresponding baffle plate (not shown).

Figure 7:
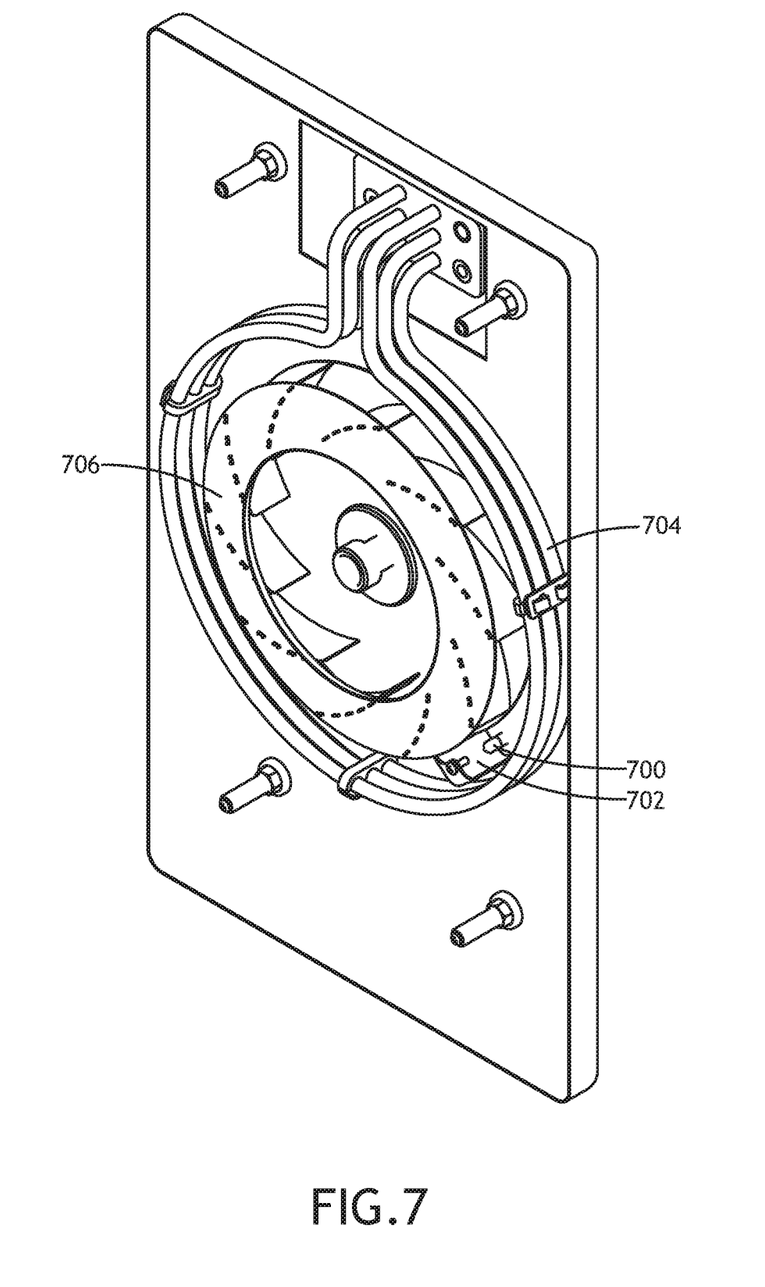
FIG. 7 shows a perspective, environmental view of a water injection system according to an exemplary embodiment.

Referring to FIG. 7, a perspective, environmental view of a water injection system according to an exemplary embodiment is shown. The water injector 700 is disposed above a drip plate 702 to deposit water onto the drip plate 702. The drip plate 702 is disposed between a heating element 704 and a fan 706 such that the heating element 704 heats the drip plate 702 sufficiently to create steam. In at least one embodiment, the drip plate 702 is disposed directly below a centerline of the fan 706. In at least one embodiment, the drip plate 702 is disposed generally below and along the perimeter of the fan 706, some distance from a centerline. The shape and airflow characteristics of the fan 706 defines a location of the drip plate 702 to efficiently distribute steam to the interior of the oven, along with a corresponding baffle plate (not shown). It may be appreciated that the disposition of the drip plate 702 should be sufficiently close to the heating element 704, and at an orientation to the nearest heating element surface to heat the drip plate 702 and produce a desired supply of steam.

Figure 8:
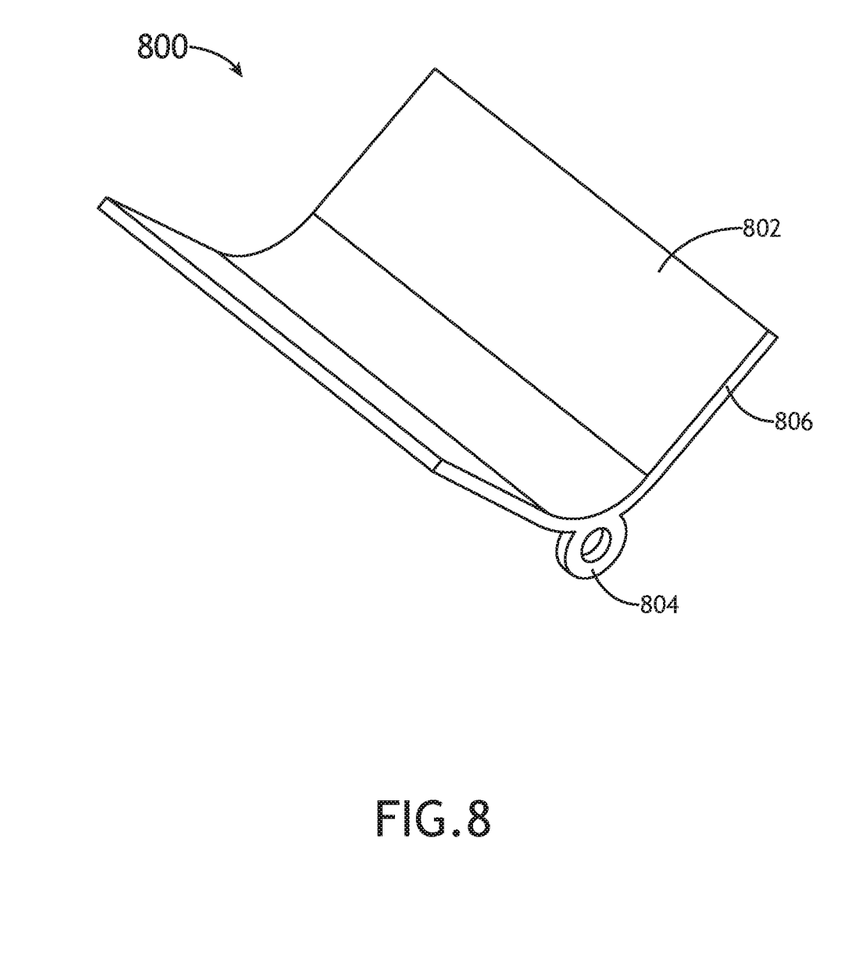
FIG. 8 shows a perspective view of a drip plate according to an exemplary embodiment.

Referring to FIG. 8, a perspective view of a drip plate 800 according to an exemplary embodiment is shown. The drip plate 800 comprises a body 802 configured for contact or proximity to a heating element. In at least one embodiment, the body 802 may be shaped to increase steaming efficiency as defined by the oven design; for example, in one embodiment, the body may be chevron shaped to retain water drops on the drip plate 800 while they vaporize. In at least one embodiment, to body 802 may define an angled baffle contact surface 806 to tilt the drip plate 800 and bias any water drops toward the baffle plate where the drip plate 800 is physically connected to prevent water drops spilling off the drip plate 800.

In at least one embodiment, the drip plate 800 includes an attachment point 804 to affix the drip plate 800 to a baffle plate in an aircraft galley oven. The attachment point 804 may comprise a flange for abutting a screw.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An oven comprising:
a fan;
a heating element disposed about a perimeter of the fan such that the fan circulates air through the heating element;
a water injector; and
a chevron shaped drip plate configured to retain water drops from the water injector on the drip plate,
wherein:
the drip plate is disposed between the water injector and the heating element, proximal to the heating element, to receive water drops due to gravity from the water injector and directly above contacts of the heating element to shield the contacts from direct exposure to water, and retain the water drops on the drip plate along an axis parallel to an axis of rotation of the fan and pointing away from the fan such that gravity acting on water drops from the water injector draws the water drops away from the fan and toward the heating element; and the drip plate is disposed between the water injector and the heating element, proximal to the heating element, to receive water drops due to gravity from the water injector, and retain the water drops on the drip plate while the heating element heats the drip plate to at least the boiling point of water to generate steam without a separate steam generating heating element.

2. The oven of claim 1, further comprising a baffle plate.

3. The oven of claim 2, wherein the drip plate is removably disposed on an internal surface of the baffle plate.

4. The oven of claim 2, wherein the baffle plate comprises baffle structures configured to direct steam flow from the drip plate.

5. The oven of claim 2, wherein the baffle plate defines a drip plate opening configured to allow the drip plate to be inserted and removed for cleaning without removing the baffle plate.

6. The oven of claim 2, wherein the baffle plate defines peripheral openings configured to distribute steam uniformly within the oven.

7. The oven of claim 1, wherein the drip plate is disposed in contact with the heating element.

8. A water injection system comprising:
a fan;
a heating element disposed about a perimeter of the fan such that the fan circulates air through the heating element;
a water injector; and
a chevron shaped drip plate configured to retain water drops from the water injector on the drip plate, wherein:

the drip plate is disposed between the water injector and the heating element, proximal to the heating element, to receive water drops due to gravity from the water injector and directly above contacts of the heating element to shield the contacts from direct exposure to water, and retain the water drops on the drip plate along an axis parallel to an axis of rotation of the fan and pointing away from the fan such that gravity acting on water drops from the water injector draws the water drops away from the fan and toward the heating element; and the drip plate is disposed between the water injector and the heating element, proximal to the heating element, to receive water drops due to gravity from the water injector, and retain the water drops on the drip plate while the heating element heats the drip plate to at least the boiling point of water to generate steam without a separate steam generating heating element.

9. The water injection system of claim 8, further comprising a baffle plate.

10. The water injection system of claim 9, wherein the drip plate is removably disposed on an internal surface of the baffle plate.

11. The water injection system of claim 9, wherein the baffle plate comprises baffle structures configured to direct steam flow from the drip plate.

12. The water injection system of claim 9, wherein the baffle plate defines a drip plate opening configured to allow the drip plate to be inserted and removed for cleaning without removing the baffle plate.

13. The water injection system of claim 8, wherein the drip plate is disposed in contact with the heating element.

14. The water injection system of claim 8, wherein the drip plate defines an angled baffle contact surface configured to tilt the drip plate and bias water drops from the water injector toward a baffle plate.

* * * * *